(12) United States Patent
Wu et al.

(10) Patent No.: US 8,775,252 B2
(45) Date of Patent: Jul. 8, 2014

(54) ELECTRONIC MEDIA SYSTEM (75) Inventors: Zhenjie Wu, South Hurstville (AU); Serge Lichman, Kingsford (AU)

(73) Assignee: National ICT Australia Limited, Eveleigh, New South Wales (AU)

( * ) Notice: Subject to any disclaimer, the term of this patent is extended or adjusted under 35 U.S.C. 154(b) by 1139 days.

(21) Appl. No.: 12/299,112

(22) PCT Filed: May 4, 2007

(86) PCT No.: PCT/AU2007/000590
§ 371 (c)(1),
(2), (4) Date: Oct. 30, 2008

(87) PCT Pub. No.: WO2007/128057
PCT Pub. Date: Nov. 15, 2007

(65) Prior Publication Data
US 2009/0177528 A1     Jul. 9, 2009

(30) Foreign Application Priority Data

May 4, 2006 (AU) ................................ 2006902338

(51) Int. Cl.
*G06Q 30/00* (2012.01)
(52) U.S. Cl.
USPC ... 705/14.43; 705/7.15; 705/7.29; 705/14.45; 705/14.49
(58) Field of Classification Search
USPC .............................. 705/7.11–7.42, 14.1–14.73
See application file for complete search history.

(56) References Cited

U.S. PATENT DOCUMENTS

| 4,755,045 | A | | 7/1988 | Borah et al. |
| 4,775,045 | A | | 10/1988 | Kuehl |
| 4,858,000 | A | | 8/1989 | Lu |
| 5,550,928 | A | | 8/1996 | Lu et al. |
| 5,781,650 | A | | 7/1998 | Lobo et al. |
| 5,848,396 | A | | 12/1998 | Gerace |
| 5,966,696 | A | * | 10/1999 | Giraud ...................... 705/14.41 |
| 6,286,005 | B1 | | 9/2001 | Cannon |
| 6,349,797 | B1 | | 2/2002 | Newville et al. |

(Continued)

FOREIGN PATENT DOCUMENTS

| NZ | 546390 | 4/2006 |
| WO | 2004/045399 | 6/2004 |

(Continued)

OTHER PUBLICATIONS

U.S. Appl. No. 10/425,489—unpublished specification of parent application document for Sharma et al. US 7,921,036.*

(Continued)

*Primary Examiner* — David Rines (57) ABSTRACT

The invention is a digital information display system (10), comprised of an electronically controlled display (20), usually used to display advertising, A video camera (30) is used to detect one or more viewers in the audience who are paying attention (100) to the display (20), and if so which part of the display (30). Based on which part of the display has the viewers attention, the advertising displayed is adjusted in real-time and based on the viewer analysis to promote continued attention from the viewer. It is an advantage of the invention that the display is able to continuously present relevant advertising content, and with reduced delay, to an audience by using its passive observation and analysis capabilities.

37 Claims, 4 Drawing Sheets

(56) References Cited

U.S. PATENT DOCUMENTS

| | | | |
|---|---|---|---|
| 6,390,376 B2 | 5/2002 | Bermel | |
| 6,460,036 B1 | 10/2002 | Herz | |
| 6,487,538 B1 | 11/2002 | Gupta et al. | |
| 6,499,029 B1 | 12/2002 | Kurapati et al. | |
| 6,505,194 B1 | 1/2003 | Nikolovska et al. | |
| 6,574,793 B1 | 6/2003 | Ngo et al. | |
| 6,577,329 B1 | 6/2003 | Flickner et al. | |
| 6,628,314 B1 | 9/2003 | Hoyle | |
| 6,718,551 B1 | 4/2004 | Swix et al. | |
| 6,868,525 B1 | 3/2005 | Szabo | |
| 6,873,710 B1 * | 3/2005 | Cohen-Solal et al. | 382/100 |
| 6,912,571 B1 | 6/2005 | Serena | |
| 7,003,139 B2 * | 2/2006 | Endrikhovski et al. | 382/118 |
| 7,107,346 B2 | 9/2006 | Boyd | |
| 7,113,916 B1 * | 9/2006 | Hill | 705/7.32 |
| 7,120,880 B1 * | 10/2006 | Dryer et al. | 715/863 |
| 7,921,036 B1 * | 4/2011 | Sharma et al. | 705/14.66 |
| 7,930,199 B1 * | 4/2011 | Hill | 705/7.29 |
| 2002/0072952 A1 | 6/2002 | Hamzy et al. | |
| 2002/0156677 A1 | 10/2002 | Peters et al. | |
| 2004/0037469 A1 | 2/2004 | Werner et al. | |
| 2005/0018216 A1 | 1/2005 | Barsness et al. | |
| 2006/0122886 A1 | 6/2006 | McKay | |
| 2007/0150353 A1 * | 6/2007 | Krassner et al. | 705/14 |

FOREIGN PATENT DOCUMENTS

| | | |
|---|---|---|
| WO | 2006/060889 | 6/2006 |
| WO | WO 2006/060889 | 6/2006 |
| WO | 2007/043954 | 4/2007 |
| WO | WO 2007/114717 | 10/2007 |
| WO | WO 2007/120686 | 10/2007 |
| WO | WO 2007/125285 | 11/2007 |

OTHER PUBLICATIONS

Vert Inc. Overview website http://www.vert.net/ 1 page.
Touchstand Advertising, "Why Touchmedia Advertising", http://www.touchstand.com:1680/advertising/WhyTSAdvertising.html, 2005, 2 pages.
VideoMining website, "Digital Media Networks—Measurement is the Key", http://videomining.com/solutions/media/main.html, Oct. 30, 2008, 1 page.
D.M. Lyons et al., "Multimodal Interactive Advertising", Philips Research Briarcliff Manor New York, Workshops on Perceptual User Interfaces, 1998, 4 pages.
Matthew Lomard et al., "Interactive Advertising and Presence: A Framework", Journal of Interactive Advertising, website http://www.jiad.org/article 13, vol. 1, No. 2, Spring 2001, 15 pages.
Publications: Damian M. Lyons, website http://trill.cis.fordham.edu/~lyons/publications.html, "Publications", Oct. 30, 2008, 10 pages.
European Examination Report dated, Feb. 17, 2012, Appl. No. 07718837.3.
Ishail Haritaoglu et al. "Attentive Billboards: Towards to Video Based Customer Behavior Understanding", Applications of Computer Vision 2002 (WACV 2002). Proceedings of the Sixth IEEE Workshop on Dec. 3-4, 2002. Piscataway, NJ, USA IEEE, pp. 127-131.
European Search Report issued Jun. 9, 2011, Appl. No. 07718837.3.

* cited by examiner

ELECTRONIC MEDIA SYSTEM

TECHNICAL FIELD

Electronic media system are used in advertising to present advertising media to the an audience. An electronic media system comprises an electronic display that can be controlled by a computer. In its most simple form the computing device might be a DVD player that generates a digital video signal. The computer may be located with the display, or control may be provided remotely over a computer network. The display is placed into a venue to show targeted information, content and advertisements, such as at point of sales, kiosks in public places or billboards.

The content can be updated without the cost and expense of changing a poster on a physical board, As a result changes can be made quickly and cost effectively, and targeted messages can be distributed to hundreds or thousands of displays at once.

The content of digital information displays can be dynamic, for instance they may involve a changing array of lights, a scrolling text message, a slide show of photos, and graphic animations as well as videos. The invention concerns, as well as the digital information system itself, a method and software for operating the digital information system.

BACKGROUND ART

Traditional static advertising displays do not make full use of the display space as its content is fixed. Dynamic displays such as scrolling pictures or video, provide content that varies with time, but it may not show appropriate content to the current audience at all times. Furthermore, a passive display does not empower the audience to explore the advertisement and obtain more information.

Touch screen based advertising systems do allow for audience interaction but they require explicit input. A user must take the initiative and in many public situations a user will be intimidated from making input. Further, the screen must be physically reachable by the audience, and therefore the size and location are constrained.

There are many other competing advertising media, such as television and the World Wide Web. In fact there is so much advertising content that traditional advertising and marketing methods are becoming less effective. It is a great challenge for advertisers and media producers to attract attention to their messages.

Evaluation is an important part in advertising. Advertising agencies work hard to justify every dollar that their clients are called to spend. In television advertising a client may have confidence that the purchase of commercial prime time advertising will result in a calculable increase in sales. At present there is a lack of such confidence in information displays, such as posters in store and billboards, and there is at present no way of demonstrating the effectiveness of this medium.

DISCLOSURE OF THE INVENTION

In a first aspect the invention provides an electronic media system to present advertising media to an audience, the system comprising an electronically controlled display, a video camera for surveillance of the display's audience and a computer programmed to:
  present advertising media, including projecting advertising images or video on the display;
  survey the audience;
  use body and face analysis of the audience to detect one or more viewers in the audience who are paying attention to the display;
  for one or more viewers and in real time, analyze their head orientation or eye gaze, or both; and then to identify part of the projected advertisement that the viewer is paying attention to; and
  based on the viewer analysis and in real time, adjust the presentation of advertising media to help retain the attention of the viewer.

This electronic media system has a number of advantages when compared to other media options. For instance, interactivity is achieved without explicit audience input. The display is able to continuously present relevant advertising content, and with reduced delay, to an audience by using its passive observation and analysis capabilities. A further advantage is that the system does not need to collect personal profile information about users in order to operate. The billboard is also able to engage a viewer's attention for increased periods of time by reacting to the interest shown.

Since the system can automatically select the most appealing advertisements from a large base, it is able to use the medium to greatest efficiency and effect. It is also able to charge advertisers in relation to the interest shown in their advertisements.

When advertising images are being displayed (other types of images may be displayed as well as advertising images) adjusting the presentation of the advertising media may involve projecting additional advertising about the product or service being advertised in part of the display that the viewer is paying attention to. This additional information could include the location of shops where the products can be purchased.

The computer system may also comprise speakers, and the computer may operate to adjust the presentation of the advertising media by playing audio to the speaker about the product or service being advertised in part of the display that the viewer is paying attention to.

In one mode of operation, multiple advertisements are shown in small size, Once the system detects that a particular small advertisement attracts a viewers attention (i.e. detecting attention in the space domain), that advertisement can be shown in larger size and further advertising for that product can be projected that has more details can be provided.

The analysis of the viewer may include analysis of the viewer behavior.

The analysis of a viewer may include analysis of the demographic of the viewer and/or analysis of measured information of the viewer. This known information may include any unmeasured information that can be stored in advance or inferred from about the audience. For instance, some demographic information can be inferred from the location, time of day and other environmental factors. This information can be combined with the measured information that can be used in the analysis of the viewer, such as a viewer's height, age, gender or facial expression, to increase the accuracy and value of the audience response measurement.

The analysis of the viewer may include analysis of the current projected advertisement.

The analysis of the viewer may determine what the viewer's interests are and the advertising projected may be adjusted to emphasize advertising that is directed towards the viewer's interests.

The computer may be further programmed to operate to use the viewer analysis to generate viewer metrics.

The computer may be further programmed to operate to generate statistical analysis of the audience in whole for any time period.

The viewer analysis may be based on two or more viewers.

The display may be in close range of the audience, such as 1 or 2 meters.

Viewers may be detected when they are facing the screen, for instance when their bodies or faces are facing the display. Face detection techniques may be used to determine when a face is facing the display. These techniques may also detect false faces, for instance when there is not movement or change in expression over a long period of time, and they discount the false face.

When multiple images are displayed in turn, then the system may be able to determine which of the images is being watched by recording the time at which the viewer paid attention to it (i.e. detecting attention in the time domain).

Identification of the part of the display that has a viewer's attention may imply different things when different images are being displayed. For instance, when a single image is displayed the identification will be of which part of the image is being watched. When multiple images are displayed at the same time, the system will identify which image is being viewed and adjusting the advertising by enlarging the projection of advertising associated with that image.

Advertising media may be presented until a viewer pays attention to the display, then the advertising media is adjusted to present a different advertising media.

Further, advertising media may be presented until a viewer no longer pays attention to the display, then the advertising media is adjusted by interruption of the current advertising media and to present a different advertising media.

Television commercials and movie trailers may be displayed as images on the display.

The audience response data, that are detected by the camera and analyzed provide real information for audience measurement, not just estimates. This information may include the number of people who look at an advertisement, the time they spend looking at it, their location and distance from the display, any movements they make and how close they approach the display, their face orientation and gaze direction. Video analysis can also be used to directly generate advertising metrics such as counting footfall (the gross number of visits of people who walk past each digital billboard), reach (footfall, counting each viewer only once) and impacts (the net audience of people proven to have viewed the advertisement and for bow long).

The system may guide a viewer to provide explicit input, for instance using animation, to explore an advertised product if that viewer wishes to obtain more information. Explicit input may be achieved by making hand gestures, or by using any other available computer input devices or techniques.

The system may also consist of motion sensors, still image capture devices and microphones to assist viewer detection and analysis. It may also comprise storage means to store the advertising images or video.

The system may even remember a viewer and their preferences.

The images or video may be accompanied by audio, such as speech or music.

The system may constantly measure the degree of attention of the viewers to score the effectiveness of the advertisement.

In a further aspect the invention provides a method for operating an electronic media system for presenting advertising media to an audience, the method comprising the following steps:

presenting advertising media, including projecting advertising images or video on an electronically controlled display;

surveying audience of the display using a video camera;

using body and face analysis of the audience to detect one or more viewers in the audience who are paying attention to the display;

for one or more viewers and in real time, analyzing their head orientation or eye gaze, or both; and identifying part of the projected advertisement that the viewer is paying attention to; and based on the viewer analysis and in real time, adjusting the presentation of advertising media to help retain the attention of the viewer.

In a further aspect the invention is software for performing the method.

BRIEF DESCRIPTION OF THE DRAWINGS

An example of the invention will now be described with reference to the accompanying drawings, in which.

BEST MODES OF THE INVENTION

In this example, the electronic media system is a digital billboard system, however the invention can also be applied to smaller scale advertising, such as in store advertising.

Figure 1:
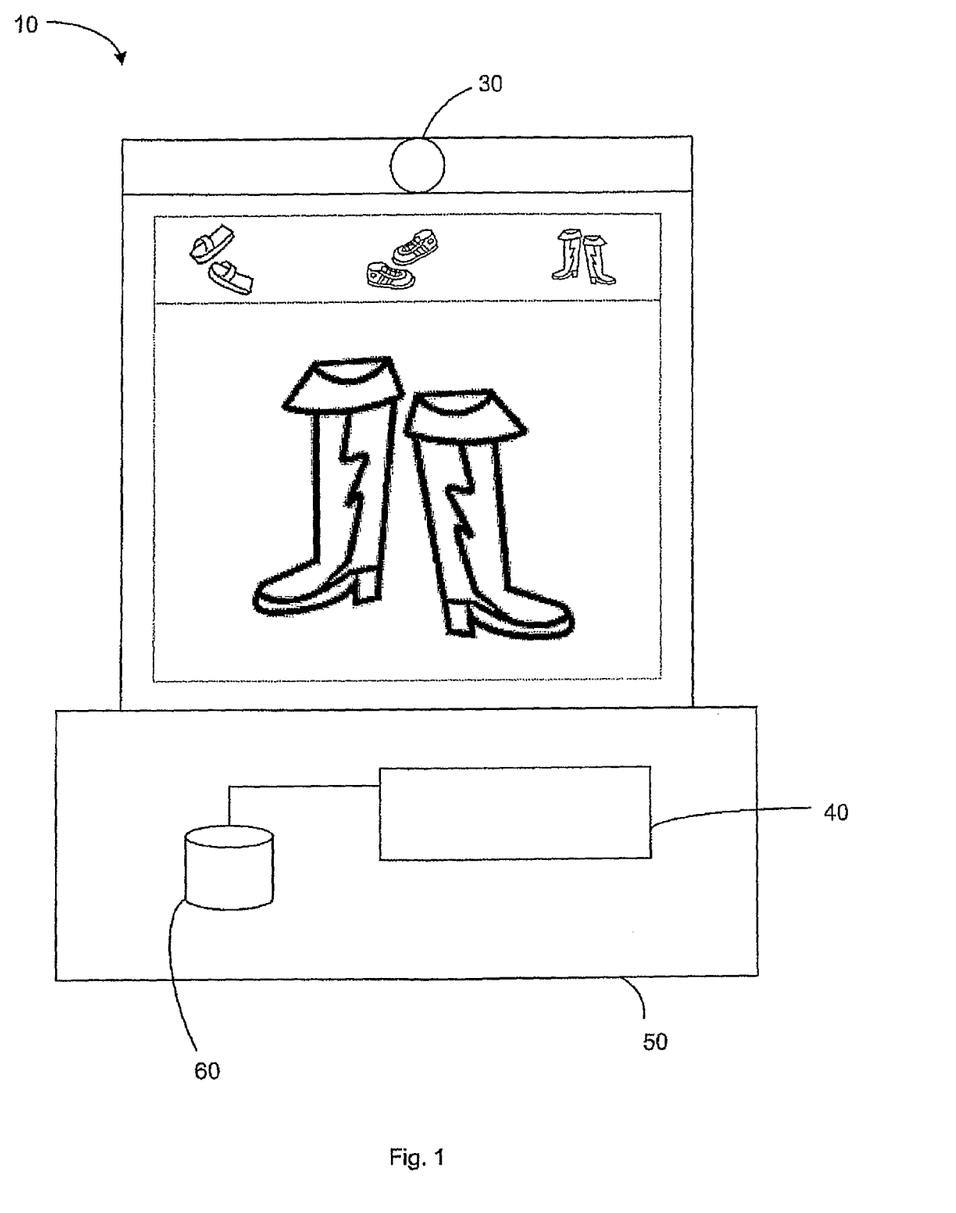
FIG. 1 is pictorial view of a digital billboard system.

Referring first to FIG. 1, a digital billboard system 10 comprises an electronic display 20, a video capture device 30 and a computing device 40. The display 20 is a video screen. The video capture device 30 is a digital video camera. The computing device 40 is housed in the base 50 of the system 10.

Figure 2:
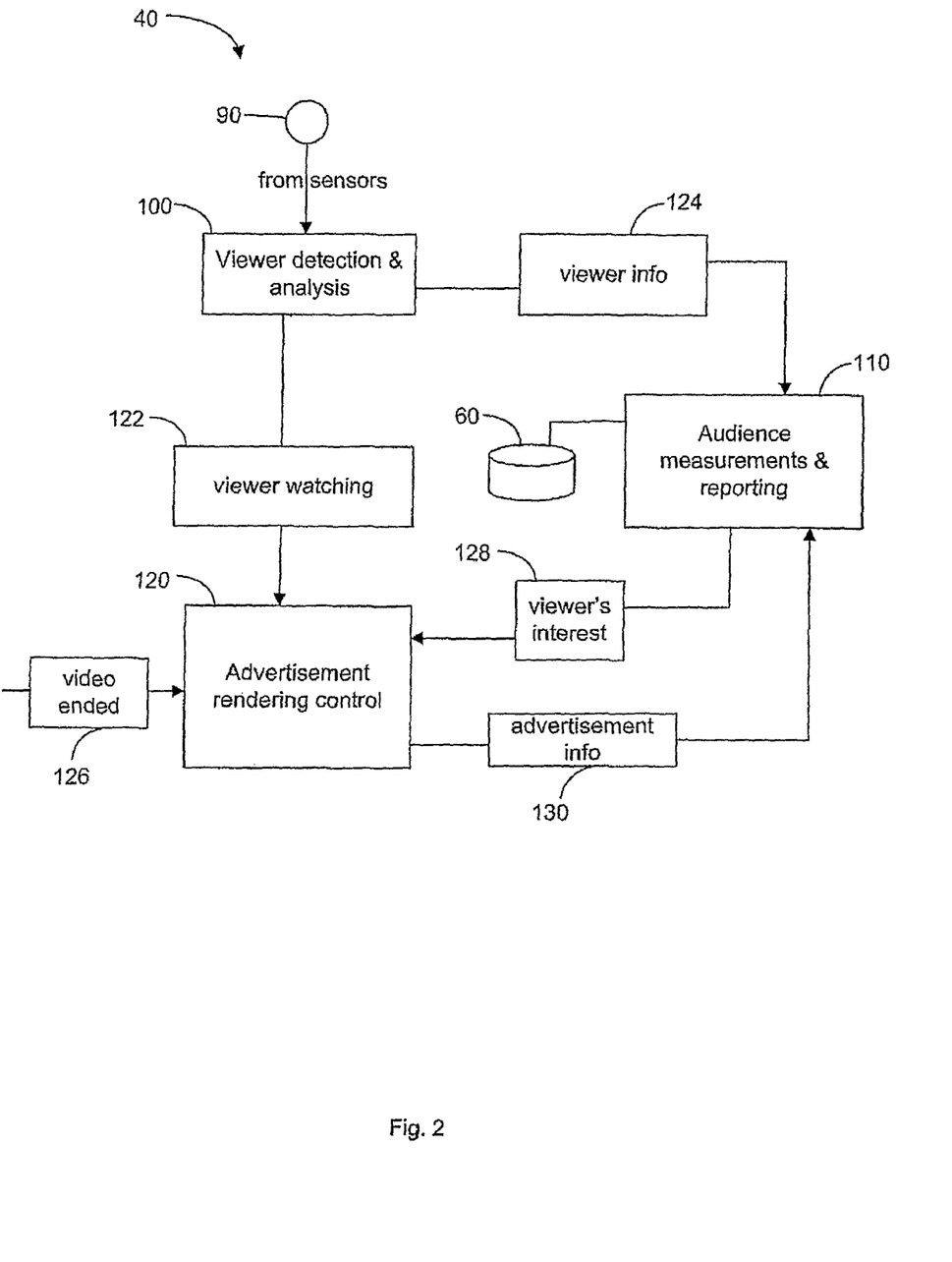
FIG. 2 is a diagram of software architecture.

Typically the computing device 40 is a programmed computer. In this case the main components of the software are a viewer detection and analysis module 100, an audience measurement and reporting module 110 and an advertisement rendering control module 120; as shown in FIG. 2.

In general, the system 10 operates by displaying content, information or advertising on its display 20 and monitoring the scene in a predefined vicinity in front of the billboard using the camera 30. Data from the camera is provided to the viewer detection and analysis module 100 via a data input port 90 to the computer 40.

The viewer detection and analysis module 100 will analyze the scene to detect whether or not any of the audience in the predetermined vicinity are paying attention to the display, such people are termed "viewers".

When no audience is detected in a predefined vicinity in front of the billboard, or when there are no viewers in the audience, the advertisement rendering control module 120 will present one advertisement at a time according to a schedule, for instance by displaying a slide show with a ten second dwell time.

Using the invention, if the viewer is interested in the product currently being advertised, the system will provide more details about that or similar product and may even call for action. If the viewer shows no interest (e.g. turning away his or her face frequently, or even about to walk away), the system will be able to detect that and quickly terminate the current video then suggest a different product. This will now be described in more detail.

Once an audience, comprising one or more viewers, is detected a message "viewer watching" 122 is sent to the advertisement rendering control module 120 to trigger a motion picture to start playing. When the motion picture is concluded a "video ended" message 126 is sent to the advertisement rendering and control module 120 so that it can trigger the next display segment.

The audience measurement and reporting module 110 will perform statistical analysis on the data received in a "viewer info" message 124 from the viewer detection and analysis module 100 to determine information, including:

The number of passers-by.
The number of people who have actually looked at each advertisement.
The length of time spent viewing by each viewer.
Demographic features such as gender and age groups of the viewers.
The area of the display that each viewer has focused on.
At the same time, the audience measurement and reporting module 110 will also receive an "advertisement info" activity report 130 from the advertisement rendering control module 120.

The determined information, combined with the "advertisement info" activity report 130 received from the advertisement rendering control module 120 are then stored in a database 60. A message containing the estimated result of "viewer's interest" 128 is sent to the advertisement rendering control module 120 for it to schedule and update the next advertisement or adjust the current advertisement.

Figure 3:
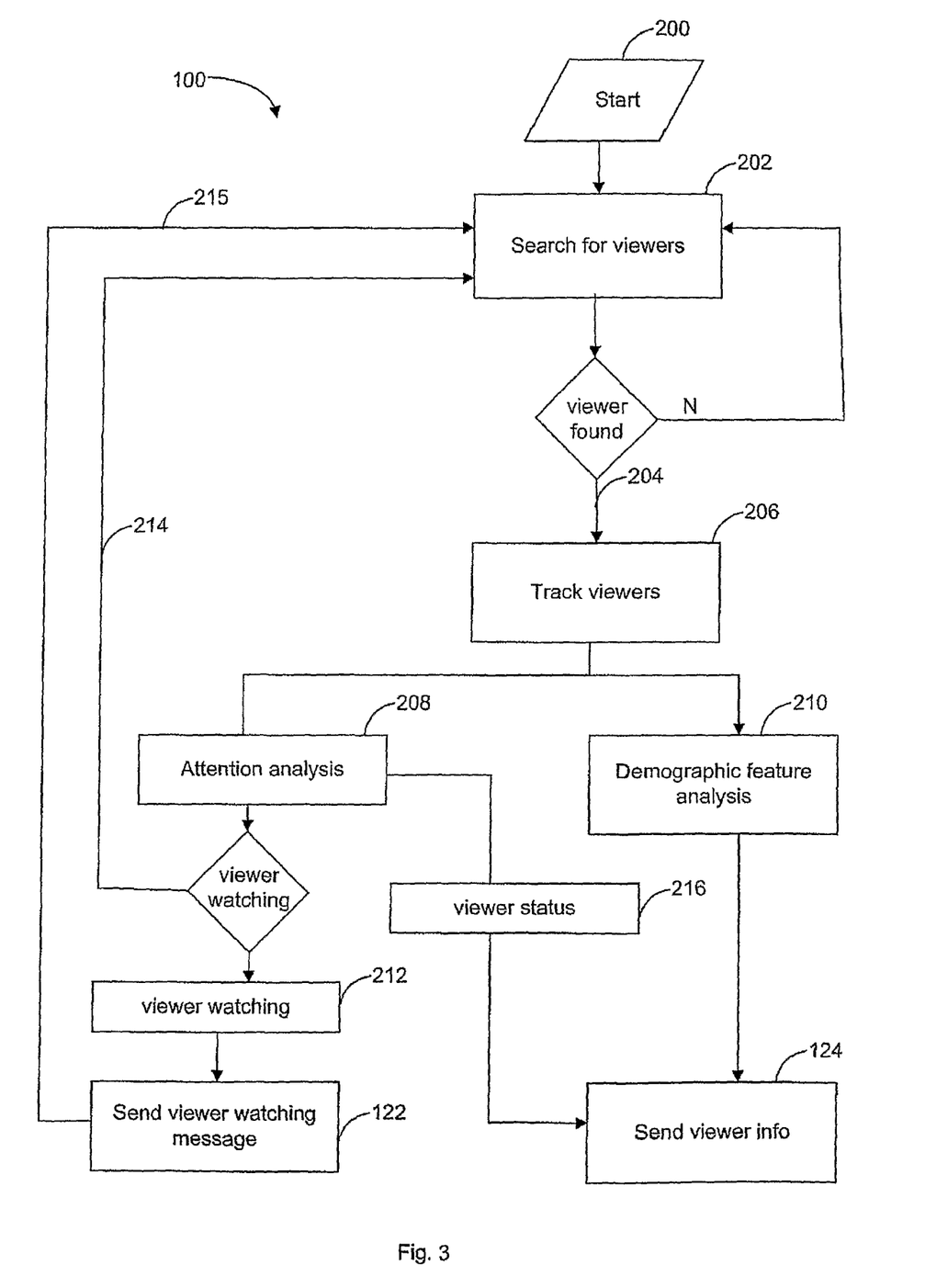
FIG. 3 is a flowchart of the operation of a viewer detection and analysis module.

A detailed flow chart for the viewer detection and analysis module 100 work is shown in FIG. 3.

From an initial condition 200, the module will commence a search for viewers 202 and continue this activity until a viewer is found 204 paying attention to the display. From that time the viewer, or viewers, will be tracked 206 as they move within the predefined vicinity. Data from the video images is analyzed for two different purposes, namely attention analysis 208 and demographic feature analysis 210.

Attention analysis 208 involves determining the orientation of the viewer's body and face, the focal point of their attention, or direction of gaze, and their facial expression. This is calculated to a precision that allows not just an assessment about whether a viewer is glancing or looking at the display, but to determine the part of the display that is being watched. In addition video and audio sensors may capture viewer's gestures, head nodding or shaking, hand movement, body posture, approach or departure, as well as verbal or nonverbal voice.

From this analysis the module determines in real-time whether a viewer is watching part of the display 212, or not 214. If the viewer is not paying attention, the program reinitiates 214 the search for viewers 202. When a viewer is detected as paying attention to the display a message is sent 122 to the advertisement rendering and control module 120; as described above. The "viewer watching" message 122 may contain information about which advertisement is attracting the viewer's attention. After sending the message 122, the program also reinitiates 215 the search for viewers 202.

Demographic feature analysis 210 involves analysis of the viewers features, posture, clothing and details about whether the viewer is accompanied riding, carrying or pushing anything; in order to estimate age, gender or any other features of interest.

The status of a viewer's attention 216 and the outcome of the demographic analysis 210 is composed into a "viewer info" message 124 for transmission to the audience measurements and reporting module 110; as described above.

Figure 4:
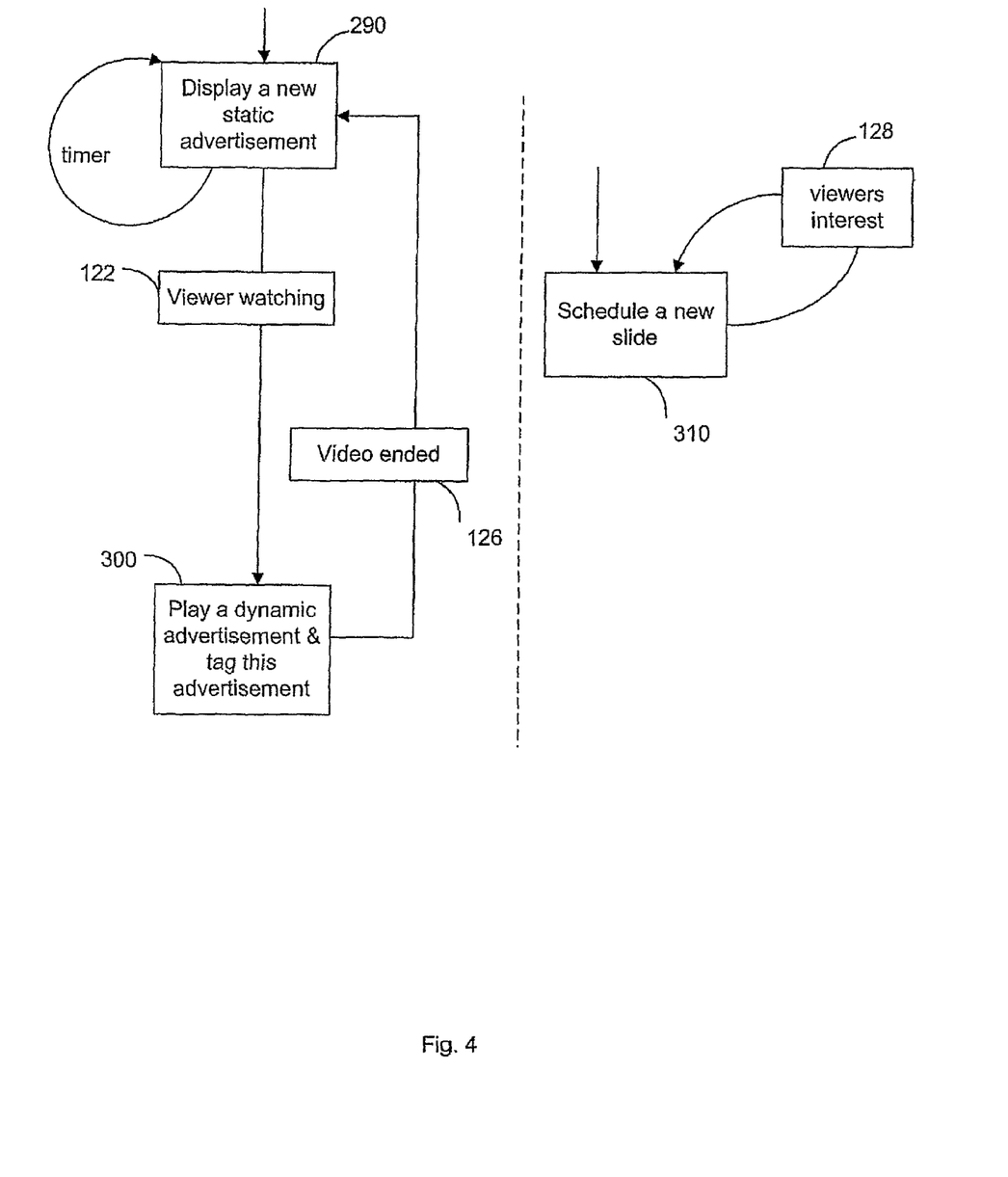
FIG. 4 is a state chart of an advertisement rendering module.

Referring now to FIG. 4, once a "viewer watching" message 122 is received at the advertisement rendering control module 120 it will change the display in real-time from displaying that slide to a video show (motion picture) that is relevant to that slide 300. By continuing to analyze a viewer, an estimate may be made of the viewer's intention and interest so that the display will present the viewer with relevant product information, including more details, options, price, where to buy, etc.

As shown in FIG. 4, a transition occurs from state 290 to state 300 after receiving a "viewer watching" message 212. Once the video starts playing, the advertisement rendering control module 120 will wait for a "video ended" message 126 before making any further changes. After receiving "video ended" message 126, the advertisement rendering control module 120 will make a transition from state 300 back to state 290.

After receiving the message about viewer's interest 128 from the audience measurements and reporting module 110, the advertisement rendering control module 120 may re-schedule its contents again in real-time, by moving to a new state 310. In this new state 310 the advertisement rendering control module 120 may for example, choose to display a slide show or motion picture of advertisements considered to be more appealing to the viewer, or viewers.

The audience measurements and reporting module 110 is able to measure footfall (the gross number of visits of people who wall past each digital billboard), reach (footfall, counting each viewer only once) and impacts (the net audience of people proven to have viewed the advertisement and for how long).

This comprehensive data will be collected for every single billboard and advertising content. It is not estimation from a sampled data and therefore will truly reflect the effectiveness of the advertisement. The collection of these data will help the evaluation of the advertising and provide an objective measurement on the effectiveness of the advertising. Based on these data, billboard controllers can support their pricing strategy while media planners can make advertising decisions. The data will also help develop better marketing strategies and create more powerful advertisements. With such capacity in hand, the billboard will be sold on the basis of audience rather than sites.

The system can also be used to perform testing on the effectiveness of an advertisement before rolling out a real advertising campaign.

Altogether the system may significantly increase the effectiveness of the advertisements by presenting material relevant to the viewers' interests. It will bring more revenue to the advertisers and as a result to the advertising site controllers.

Although the invention has been described with reference to a particular example it will be understood that many modifications and additions are possible within the scope of the invention contemplated.

For instance, several advertisements can be shown simultaneously on the display, each taking up part of the display area. In this case all the adverts may be same size, or they may vary in size. The system may react to a viewer by displaying a different configuration of adverts, for instance one where an advert likely to be of more interest to the viewer is more prominent. For example, if the system detects that an adult with a child is nearby, it may replace a series of wine advertisements with toy advertisements, and then monitor if it can grab the viewers attention. In fact the whole schedule of display can be changed as the audience demographic is seen to change.

Text may be displayed along with images, particularly text providing related information such as: when the system is advertising a film in a shopping mall the text may give the movie show times for that, and other, films at a cinema in the mall.

The viewer detection and analysis module 100 may also estimate the number of unique viewers for each advertisement and send that data in the viewer information message 124 to the audience measurements and reporting module 110.

The viewer detection and analysis module 100 may also estimate the number of near-by persons who do not pay attention to an advertisement and send that data to the audience measurements and reporting module 110.

The system may play sound or speak to the viewers. For example, the lights may flash to retain the viewer's interest.

The system can be implemented as a stand-alone device such as a kiosk.

The system may be installed in public places such as shopping malls, point of sales terminals in store, railway stations and airports. In addition it may be located in franchised retail stores.

The system can be used to test the market for new or proposed products or services.

Audience reporting may be communicated using wireless technologies.

Adjusting the advertising media may take many forms. For example, a slide show may be projected on the display until a viewer faces the display. Then the advertising projected is changed to a short (e.g. 2-3 seconds) motion picture sequence from beginning to end, which is called the attraction mode, aiming at attracting the viewer's attention and providing key message up front. If the viewer continues to face the display during the attraction mode, the system assumes that the viewer is interested in the message and will provide detailed information, which is called the education mode, usually with longer (e.g. 10-30 seconds) motion picture sequence than the attraction mode. If the viewer faces the display long enough during the education mode, the system may have option to make transition into a call-for-action mode. For example, it may direct the viewer to the store that the product is on sale. If in any stage of the education mode the viewer faces away from the display for a predetermined period of time, the system will assume the viewer is loosing the interest. It will quickly exit the education mode and enter a new attraction mode, start advertising a different product. If the viewer faces away from the display during an attraction mode, the system will enter another attraction mode.

The invention may also apply when the electronic media system is being used for surveillance purposes. In this case the electronic media system will be used to display any form of media content which may be useful for surveillance purposed, and is not limited to advertising.

The claims defining the invention are as follows:

1. An electronic media system to present advertising media to an audience, the system comprising an electronically controlled display, a video camera for surveillance of the display audience and a computer programmed to:
   present advertising media, including simultaneously projecting multiple advertising images or video on the display;
   survey the audience;
   use body or face analysis of the audience to detect one or more viewers in the audience who are paying attention to the display;
   for one or more viewers and in real time, perform analysis of head orientation or eye gaze, or both, and then identify which one of the multiple advertising images or video that the one or more viewers are paying attention to; and
   based on the analysis and in real time, adjust the presentation of advertising media to help retain the attention of the one or more viewers by projecting additional advertising about the product or service being advertised in the one of the multiple advertising images or video that the one or more viewers are paying attention to.

2. The system according to claim 1, further comprising speakers, and the computer operates to adjust the presentation of advertising media by playing audio to the speakers about the product or service being advertised in the one of the multiple advertising images or video that the one or more viewers are paying attention to.

3. The system according to claim 1, wherein the analysis includes analysis of the demographic of the one or more viewers.

4. The system according to claim 1, wherein the analysis includes analysis of information measured from the one or more viewers, including one or more of the one or more viewers height, age, gender or facial expression.

5. The system according to claim 1, wherein the analysis includes analysis of the one or more viewers' behavior.

6. The system according to claim 1, wherein the analysis includes analysis of one of the multiple advertising images or video that the one or more viewers are paying attention to.

7. The system according to claim 1, wherein the analysis determines the one or more viewers' interests and the presentation of advertising media is adjusted to emphasize advertising that is directed towards the one or more viewers' interests.

8. The system according to claim 1, wherein the computer is further programmed to operate to use the analysis to generate viewer metrics.

9. The system according to claim 1, wherein the computer is further programmed to generate statistical analysis of the audience in whole for any time period.

10. The system according to claim 1, wherein the display is within 1 to 5 meters of the audience.

11. The system according to claim 1, wherein the one or more viewers are detected when either their body or face is facing the display.

12. The system according to claim 11, wherein face detection techniques are used to determine when a face is facing the display.

13. The system according to claim 1, wherein multiple images are projected in turn, and the system is able to identify which advertisement has the one or more viewers' attention based on the time the one or more viewers pay attention to the display.

14. The system according to claim 1, wherein the advertising media is presented until the one or more viewers pay attention to the display, then the advertising media is adjusted in real time to present a different advertising media.

15. The system according to claim 1, wherein the advertising media is presented until the one or more viewers no longer pay attention to the display, then the advertising media is adjusted by interruption of the current advertising media and presenting a different advertising media.

16. The system according to claim 1, further comprising motion sensors, still image capture devices, microphones and storage means to store the advertising images and video.

17. The system according to claim 1, wherein the computer operates to adjust the presentation media by making the one of the multiple advertising images or video that the one or more viewers are paying attention to, larger in size.

18. The system according to claim 1, wherein the computer operates to guide the one or more viewers to provide explicit input.

19. A computer-implemented method for operating an electronic media system for presenting advertising media to an audience, the method comprising the following steps:
   presenting an electronically controlled display of advertising media, including simultaneously projecting multiple advertising images or video;
   using a video camera to survey the audience of the display;
   using a computer for performing body and face analysis of the audience to detect one or more viewers in the audience who are paying attention to the display;
   using a computer in real time, for analyzing head orientation or eye gaze, or both on one or more viewers, and identifying which one of the multiple advertising images or video that the one or more viewers are paying attention to; and
   based on the analysis and in real time, using a computer for adjusting the presentation of advertising media on the electronic display to help retain the attention of the one or more viewers by projecting additional advertising about the product or service being advertised in the one of the multiple advertising images or video that the one or more viewers are paying attention to.

20. The method according to any claim 19, wherein the presentation of advertising media is adjusted by playing audio to speakers about the product or service being advertised in the one of the multiple advertising images or video that the one or more viewers are paying attention to.

21. The method according to claim 19, wherein the analysis includes analyzing the demographic of the one or more viewers.

22. The method according to claim 19, wherein the analysis includes analyzing the information measured from the one or more viewers, including one or more of the viewers' height, age, gender or facial expression.

23. The method according to claim 19, wherein the analysis includes analyzing the behavior of one or more viewers.

24. The method according to claim 19, wherein the analysis includes analyzing the one or more multiple advertising images or video that the one or more viewers are paying attention to.

25. The method according to claim 19, wherein the analysis includes determining the one or more viewers' interests and adjusting the presentation of advertising media by emphasizing advertising that is directed towards the one or more viewers' interests.

26. The method according to claim 19, wherein the method further comprises using the analysis to generate viewer metrics.

27. The method according to claim 19, wherein the method further comprises generating a statistical analysis of the audience in whole for any time period.

28. The method according to claim 19, wherein the display is Within 1 to 5 meters of the audience.

29. The method according to claim 19, wherein the step of detecting involves determining if the body or face of the audience is facing the display.

30. The method according to claim 29, further comprising using face detection techniques to determine when a face is facing the display.

31. The method according claim 19, wherein the step of presenting advertising media further involves projecting multiple images in turn, and the method further comprising identifying which advertising has the one or more viewers' attention is based on the time the one or more viewers pay attention to the display.

32. The method according to claim 19, wherein the step of presenting advertising media involves presenting advertising images or video until the one or more viewers pay attention to the display, and the step of adjusting the display involves presenting a different advertising media in real time.

33. The method according to claim 19, wherein the step of presenting advertising media involves presenting advertising images or video until the one or more viewers no longer pay attention to the display, and the step of adjusting the display involves interruption to the current advertising media and presenting a different advertising media.

34. The method according to claim 19 wherein the presentation of advertising media is adjusted by making the one or more multiple advertising images or video that the one or more viewers are paying attention to, larger in size.

35. The method according to claim 19 wherein the method further comprises the step of guiding the one or more viewers to provide explicit input.

36. A non-transitory computer-readable medium containing executable instructions to perform a method for operating an electronic media system for presenting advertising media to an audience, the method comprising the following steps:
   presenting on an electronically controlled display advertising media, including simultaneously projecting multiple advertising images or video;
   using a video camera surveying the audience of the display;
   using a computer, using body or face analysis of the audience to detect one or more viewers in the audience who are paying attention to the display;
   using a computer, for one or more viewers and in real time, performing analysis of head orientation or eye gaze, or both, and identifying which one of the multiple advertising images or video that the one or more viewers are paying attention to; and
   using a computer, based on the analysis and in real time, adjusting the presentation of advertising media on the electronic display to help retain the attention of the one or more viewers by projecting additional advertising about the product or service being advertised in the one of the multiple advertising images or vides that the one or more viewers are paying attention to.

37. An electronic media system to present media content to an audience, the system comprising an electronically controlled display, a video camera for surveillance of the display's audience and a computer programmed to:
   present media, including simultaneously projecting multiple images or video on the display;
   survey the audience;
   use body or face analysis of the audience to detect one or more viewers in the audience who are paying attention to the display;
   for one or more viewers and in real time, perform analysis of head orientation or eye gaze, or both; and then identify a part of the display having one of the multiple images or video that the one or more viewers are paying attention to; and
   based on the analysis and in real time, adjust the presentation of media by projecting additional media about the images or video being displayed that the one or more viewers are paying attention to.

* * * * *